(12) United States Patent
Smith, Jr.

(10) Patent No.: US 12,344,059 B1
(45) Date of Patent: Jul. 1, 2025

(54) MODULAR CLEVIS MOUNT ASSEMBLY

(71) Applicant: Fox Factory, Inc., Duluth, GA (US)

(72) Inventor: Bobby Lee Smith, Jr., Alpine, CA (US)

(73) Assignee: Fox Factory, Inc., Duluth, GA (US)

(*) Notice: Subject to any disclaimer, the term of this patent is extended or adjusted under 35 U.S.C. 154(b) by 0 days.

(21) Appl. No.: 18/607,207

(22) Filed: Mar. 15, 2024

(51) Int. Cl.
*B60G 15/02* (2006.01)

(52) U.S. Cl.
CPC ........ *B60G 15/02* (2013.01); *B60G 2204/129* (2013.01)

(58) Field of Classification Search
CPC .. B60G 2204/129; B60G 15/02; B60G 15/06; B60G 15/062; B60G 15/063; B60G 15/07; B60G 13/005; B60G 13/006; B60G 13/008
See application file for complete search history.

(56) References Cited

U.S. PATENT DOCUMENTS

| | | | | |
|---|---|---|---|---|
| 4,582,338 A | * | 4/1986 | Colanzi | F16F 9/54 301/125 |
| 5,078,417 A | * | 1/1992 | Mouritsen | B62K 21/02 264/258 |
| 5,094,325 A | * | 3/1992 | Smith | F16F 13/00 188/282.1 |
| 5,782,484 A | * | 7/1998 | Kuhn, Jr. | B60G 3/265 267/248 |
| 6,951,343 B2 | * | 10/2005 | Hildebrand | B60G 11/02 280/124.17 |
| 7,997,599 B2 | * | 8/2011 | Zmyslowski | B60G 11/16 280/124.135 |
| 8,550,223 B2 | * | 10/2013 | Cox | F16F 9/18 188/322.22 |
| 10,160,279 B2 | * | 12/2018 | Khaja | B60G 11/14 |
| 11,794,542 B2 | * | 10/2023 | Boulay | F16F 9/19 |
| 11,807,059 B1 | * | 11/2023 | Smith | B60G 15/062 |
| 2022/0281278 A1 | * | 9/2022 | Boulay | B60G 13/005 |
| 2024/0227482 A1 | * | 7/2024 | Smith | B60G 15/063 |

* cited by examiner

*Primary Examiner* — Laura Freedman

(57) ABSTRACT

A modular clevis comprising, a first wing and a second wing parallel to one another wherein said first wing has a first opening and said second wing has a second opening, said first opening and said second opening to couple with a structural component of a vehicle. The modular clevis further comprising a plurality of adapter openings. An adapter mount comprising, a shaft opening configured to receive and couple with a shaft of a damper. The adapter mount further comprising a plurality of mount openings to align with said plurality of adapter openings of said modular clevis and to couple with said modular clevis via a plurality of fasteners.

15 Claims, 12 Drawing Sheets

US 12,344,059 B1

MODULAR CLEVIS MOUNT ASSEMBLY

FIELD OF THE INVENTION

Embodiments of the invention generally relate to a modular clevis mount assembly comprising a modular clevis and an adapter mount for suspension assemblies.

BACKGROUND

Shock assemblies (e.g., dampers, shock absorbers, springs etc.) are used in numerous different vehicles and configurations to absorb some or all of a movement that is received at an unsprung portion of a vehicle before it is transmitted to a suspended portion of the vehicle. For example, when a wheel hits a pothole, the encounter will cause an impact force on the wheel. However, by utilizing suspension components including one or more shock assemblies, the impact force can be significantly reduced or even absorbed completely before it is transmitted to a person on a seat of the vehicle. However, depending upon the terrain being traversed, it can be valuable to be able to change the amount of shock absorption provided by the shock assembly, including changing the type of springs, for personal comfort, vehicle performance, and the like.

BRIEF DESCRIPTION OF THE DRAWINGS

Aspects of the present invention are illustrated by way of example, and not by way of limitation, in the accompanying drawings, wherein.

The drawings referred to in this description should be understood as not being drawn to scale except if specifically noted.

DESCRIPTION OF EMBODIMENTS

The detailed description set forth below in connection with the appended drawings is intended as a description of various embodiments of the present invention and is not intended to represent the only embodiments in which the present invention is to be practiced. Each embodiment described in this disclosure is provided merely as an example or illustration of the present invention, and should not necessarily be construed as preferred or advantageous over other embodiments. In some instances, well-known methods, procedures, and objects have not been described in detail as not to unnecessarily obscure aspects of the present disclosure.

In general, a suspension system for a vehicle provides a motion modifiable connection between a portion of the vehicle that is in contact with a surface (e.g., an unsprung portion) and some or all of the rest of the vehicle that is not in contact with the surface (e.g., a suspended portion).

Components of a modular clevis mount assembly can be described as a two-piece clevis design and can include a modular clevis and an adapter mount. Typically, a clevis is defined as a U-shaped fastening device with an opening in each of the arms of the "U", through which a pin or bolt can be inserted. The present modular clevis can be mounted to a structural component of a vehicle and the adapter mount can be mounted to a shaft of a damper of a suspension assembly. The adapter mount and the modular clevis can be coupled to one another via fasteners. The adapter mount may have an outer diameter or width that is smaller than an inner diameter of a spring associated with the suspension assembly such that the adapter mount may pass through the inner diameter of the spring. The outer diameter or width of the modular clevis may be larger than the inner diameter of the spring and may not pass through the inner diameter of the spring. Thus, the modular clevis and the adapter mount can be decoupled from one another to allow a spring to be changed for a different spring in the suspension assembly without decoupling the adapter mount from the shaft of the damper.

Figure 1:
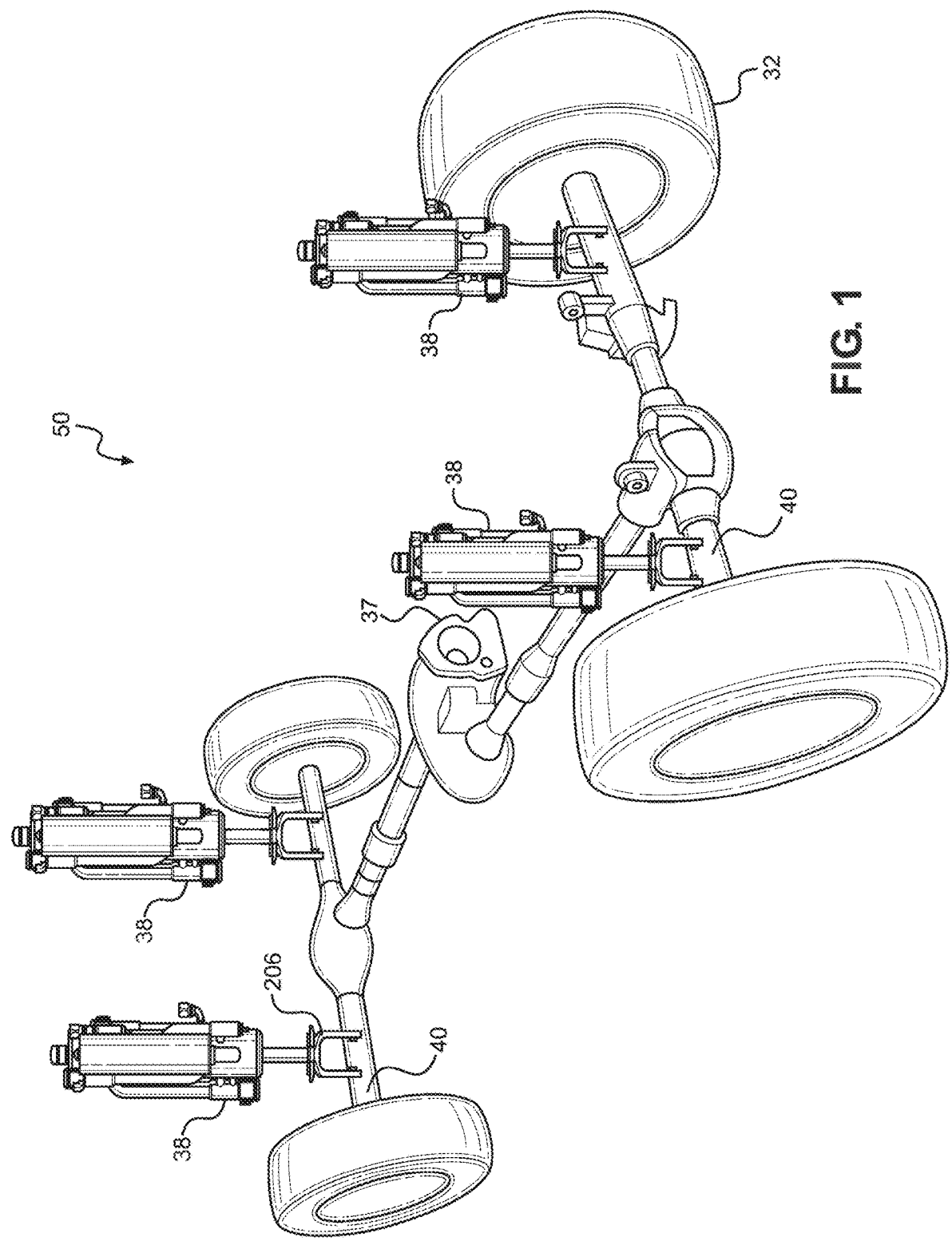
FIG. 1 is a perspective view of a vehicle having a front and rear damper piston assembly, in accordance with an embodiment.

Referring now to FIG. 1, a perspective view of a vehicle 50 having at least one shock assembly 38 is shown in accordance with an embodiment. Although a wheeled vehicle 50 is used in the discussion, at least one shock assembly 38 disclosed herein is also suited for use in any other vehicle utilizing a suspension. In one embodiment, shock assembly 38 with dampers is also suited for use in suspension inclusive devices such as, but not limited to, an exoskeleton, a seat frame, a prosthetic, a suspended floor, a door opening/closing damper, a lift assist damper, or any other application where a controlled compression and/or rebound of a suspension/damper is desired. However, in the following discussion, and for purposes of clarity, a 4-wheeled vehicle 50 is utilized as the example vehicle upon which the at least one shock assembly 38 is shown and described.

In one embodiment, vehicle 50 is a generic vehicle such as a car, truck, side-by-side, or the like driven by an engine and consisting of an unsprung portion (such as tires 32, drive train 37, axles, etc.), a sprung portion (such as a cockpit, seating area, etc.), and a suspension including at least one shock assembly 38 to couple the sprung portion of the vehicle with the unsprung portion.

In one embodiment, vehicle 50 includes axles 40. At least one shock assembly 38 can be coupled to one of axles 40 via a clevis 206. It should be appreciated that clevis 206 can be mounted to many different structural components of vehicle 50 other than axles 40.

Clevis

Figure 2A:
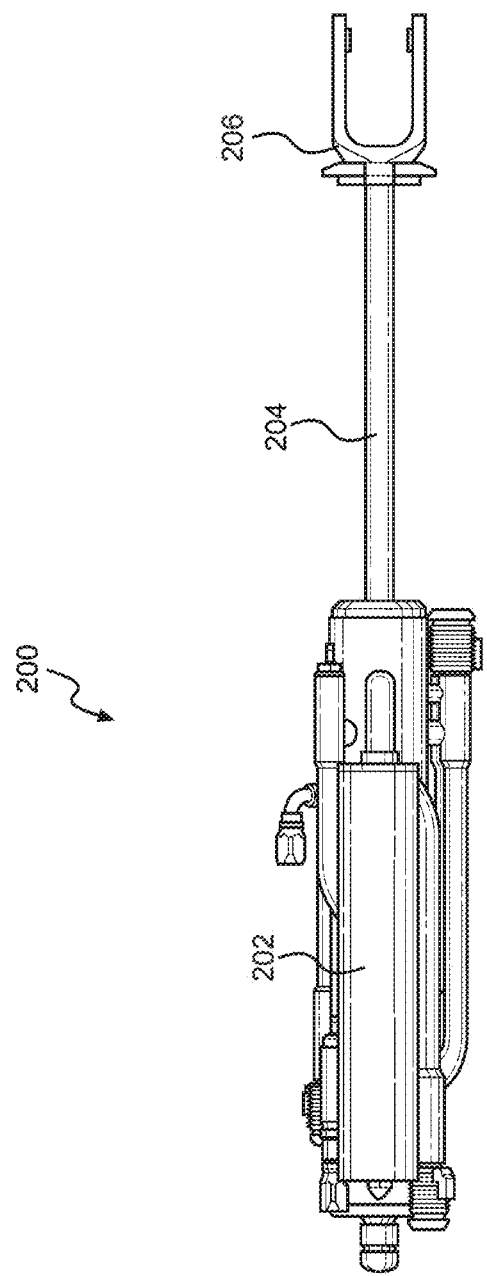
FIG. 2A is a side view of a suspension assembly, in accordance with an embodiment.

With reference now to FIG. 2A a side view of a suspension assembly 200 is shown in accordance with one embodiment. Suspension assembly 200 includes a damper 202 with a shaft 204. Clevis 206 is attached to the end of shaft 204 to enable coupling of suspension assembly 200 to a vehicle. Clevis 206 of FIG. 2A is one piece clevis and is shown for illustrative purposes.

Figure 2B:
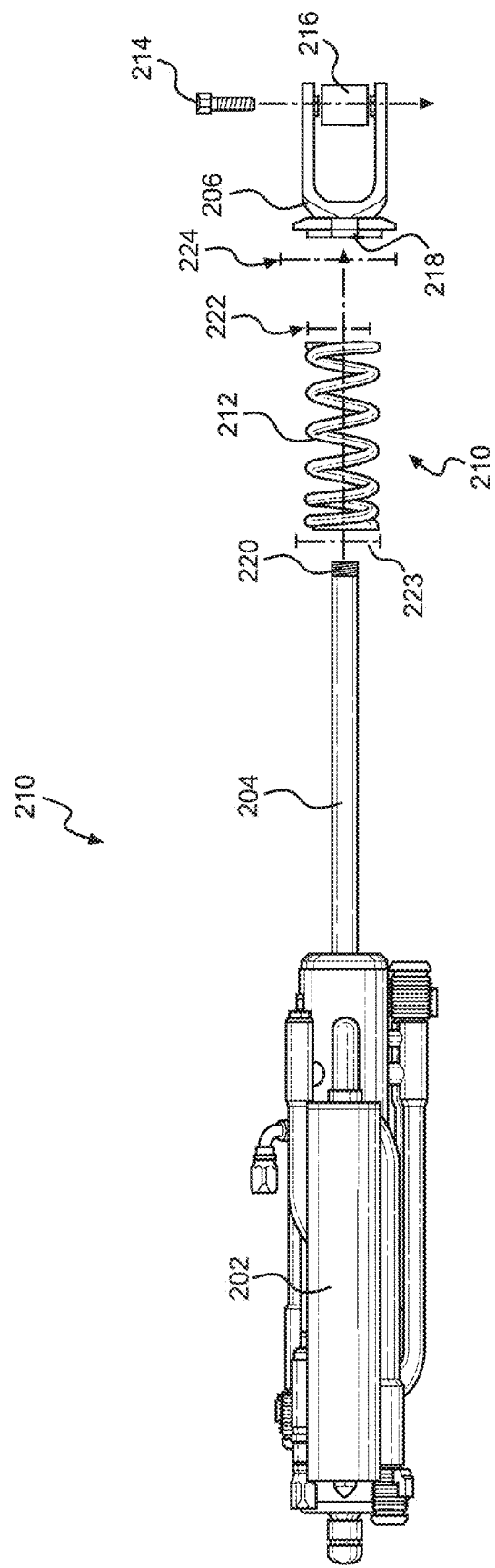
FIG. 2B is an exploded side view of a suspension assembly, in accordance with an embodiment.

With reference now to FIG. 2B an exploded side view of a suspension assembly 210 is shown in accordance with one embodiment. Suspension assembly 210 of FIG. 2B includes the components of suspension assembly 210 of FIG. 2A and also includes a spring 212, a fastener 214, and a structural component 216 of a vehicle.

In one embodiment, clevis 206 has a threaded opening 218 that is configured to receive and couple to a threaded end 220 of shaft 204. Clevis 206 can be coupled or fastened to shaft 204 at a recommended torque value. The recommended torque value ensures that clevis 206 is appropriately coupled with shaft 204. That is, the recommended torque value ensures that threaded opening 218 of clevis 206 and threaded end 220 of shaft 204 are screwed together with sufficient force to ensure a secure coupling. Additionally, the recommended torque value ensures that the amount of force used does not exceed a value which could damage, for example, threaded opening 218, threaded end 220, shaft 204 or clevis 206. In one embodiment, a thread-locking adhesive can be applied to threaded end 220 and/or threaded opening 218 before being coupled together. The thread-locking adhesive is also referred to as thread-locking fluid, threadlocker, or thread-locking glue.

As shown in FIG. 2B, spring 212 is sized to fit over and around shaft 204 prior to coupling clevis 206 to shaft 204. That is, spring 212 has an inner diameter 222 which is larger than the outer diameter of shaft 204. A suspension assembly, such as suspension assembly 210, wherein a spring is disposed over and around the shaft of a damper may be referred to as a "coilover" suspension, a "coil over shock assembly" and the like. It should be appreciated that embodiments of the present invention are well suited to use with any suspension assembly.

During the lifetime of suspension assembly 210, it may be desired to replace spring 212 with a new or different spring. As shown in FIG. 2B, outer diameter 224 of clevis 206 (sometimes referred to as the "width" of clevis 206) is greater than both inner diameter 222 and outer diameter 223 of spring 212. Because outer diameter 224 of clevis 206 is greater than the aforementioned inner diameter 222 of spring 212, it is not possible to slide spring 212 over clevis 206. Thus, once clevis 206 is coupled with shaft 204, spring 212 is retained on shaft 204 with clevis 206 preventing spring 212 from sliding off of shaft 204. Moreover, spring 212 can only be removed from shaft 204 by first detaching/removing clevis 206 from shaft 204.

Occasionally, due to the presence of rust, debris, or for other reasons, removing clevis 206 from shaft 204 may require using a force which is greater than the recommended torque value. Additionally, removing clevis 206 from shaft 204 may require heating or burning of any thread-locking adhesive which was used when coupling clevis 206 to shaft 204. As one example, if a vehicle is in the field and the user desires to change spring 212, the user may not have the tools available to ensure adherence to the recommended torque value. As a result, removal of clevis 206 is impossible or results in damage to one or more of, for example, threaded opening 218, threaded end 220, shaft 204 or clevis 206. Embodiments of the present invention include a two-piece modular clevis mount assembly which enables a user to readily remove a spring without the drawbacks previously associated with detaching a clevis from a shaft of a damper.

Modular Clevis Mount Assembly

Figure 3:
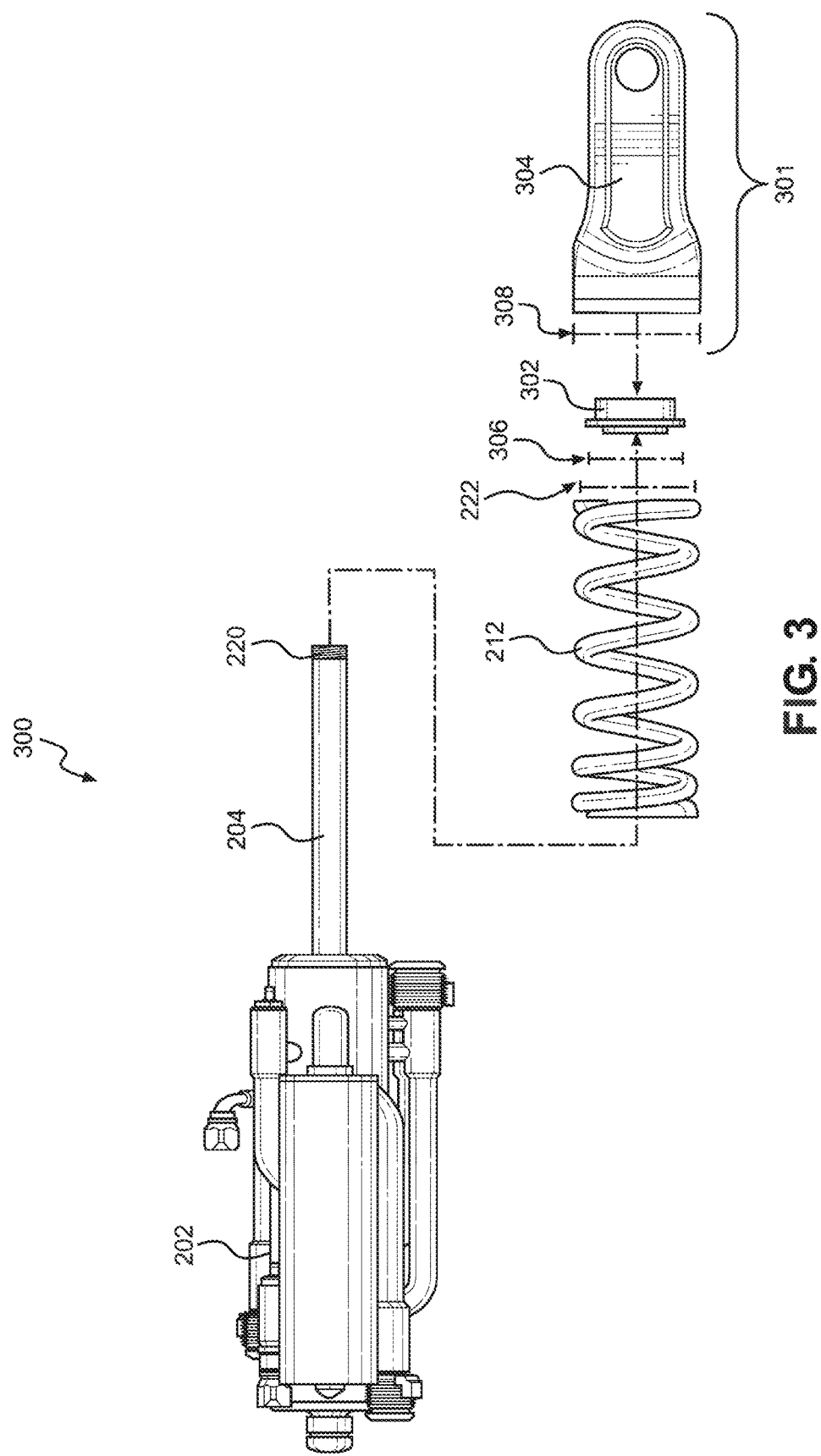
FIG. 3 an exploded side view of a suspension assembly with a modular clevis mount, in accordance with an embodiment.

With reference now to FIG. 3, an exploded side view of a suspension assembly 300 with the present modular clevis mount assembly 301 is provided. Modular clevis mount assembly 301 is comprised of an adapter mount 302 and a modular clevis 304. Adapter mount 302 and modular clevis 304 are configured to be coupled together. In one embodiment, outer diameter 306 of adapter mount 302 is smaller or less than the inner diameter 222 of the spring 212. In one embodiment, adapter mount 302, in entirety, can pass through inner diameter 222 of spring 212. In one embodiment, an outer diameter 308 or width of modular clevis 304 is wider or greater than inner diameter 222 of the spring 212 and modular clevis 304 is not able to pass through spring 212. Adapter mount 302 include a threaded opening and can be fastened to threaded end 220 of shaft 204. In one embodiment, adapter mount 302 can be fastened to shaft 204 at a recommended torque value. For example, the recommended torque value may be 120 and foot pounds of pressure. During operation of the vehicle and the suspension assembly, shaft 204 can rotate and therefore has the potential to come unfastened from adapter mount 302. Because of this potential to come unfastened the joining or coupling of adapter mount 302 and shaft 204 can be considered a critical joint with a high torque specification. The two-piece modular clevis mount assembly of the present invention allows for springs and/or a modular clevis to be changed in a suspension assembly without disturbing the critical joint of adapter mount 302 and shaft 204.

In one embodiment, adapter mount 302 can be fastened to shaft 204 using a thread-locking adhesive. In one embodiment, adapter mount 302 can be coupled to modular clevis 304 via one or more fasteners at a torque value lower than recommended torque value used to couple adapter mount 302 to shaft 204. In such an embodiment, decoupling adapter mount 302 from modular clevis 304 can be easier than decoupling adapter mount 302 from shaft 204 for purposes such as changing springs and can be useful in environments such as the field. In other words, a suspension assembly with a two-piece modular clevis mount assembly of the present invention can allow for springs to be changed in a shorter amount of time as compared to a suspension assembly with a one piece clevis design. In one embodiment, the fasteners used to couple modular clevis 304 to adapter mount 302 can be installed or removed using common tools such as a wrench or a socket wrench.

In various embodiments, adapter mount 302 can be fastened to shaft 204 before or after modular clevis 304 has been coupled to adapter mount 302. Adapter mount 302 can be coupled to modular clevis 304 before or after modular clevis 304 has been coupled to structural component of a vehicle. In one embodiment, adapter mount 302 can be decoupled from modular clevis 304 while modular clevis 304 remains coupled to the vehicle. In one embodiment, adapter mount 302 can be coupled with a variety of different sized modular clevises. In one embodiment, a different sized modular clevis may be able to pass through inner diameter 222 of spring 212. In one embodiment, adapter mount 302 may be capable of coupling to a different device such as a modular eyelet. Modular eyelet may or may not be wider than inner diameter 222 and may or may not be able to pass through spring 212.

In one embodiment, a modular eyelet may include a spherical bearing and modular clevis 304 may not include a spherical bearing. In one embodiment, a modular eyelet may employ two tabs on a vehicle where the modular eyelet is coupled to the vehicle by being placed between the two tabs of the vehicle and bolt or pin is passed through the two tabs and the modular eyelet. Modular clevis 304 may be coupled or installed on the vehicle without the use of the two tabs employed by a modular eyelet.

In various embodiments, adapter mount 302 and modular clevis 304 can be composed of the same material or of different materials. In one embodiment, adapter mount 302 is composed of steel such as mild steel. In one embodiment, modular clevis 304 is composed of aluminum or an aluminum alloy. The two-piece modular clevis mount assembly allows for adapter mount 302 to be composed of a stronger material, such as steel, and modular clevis 304 to be composed of a lighter material such as aluminum. Such an embodiment can allow for adapter mount 302 to be stronger at the critical joint between shaft 204 and adapter mount 302.

Figure 4:
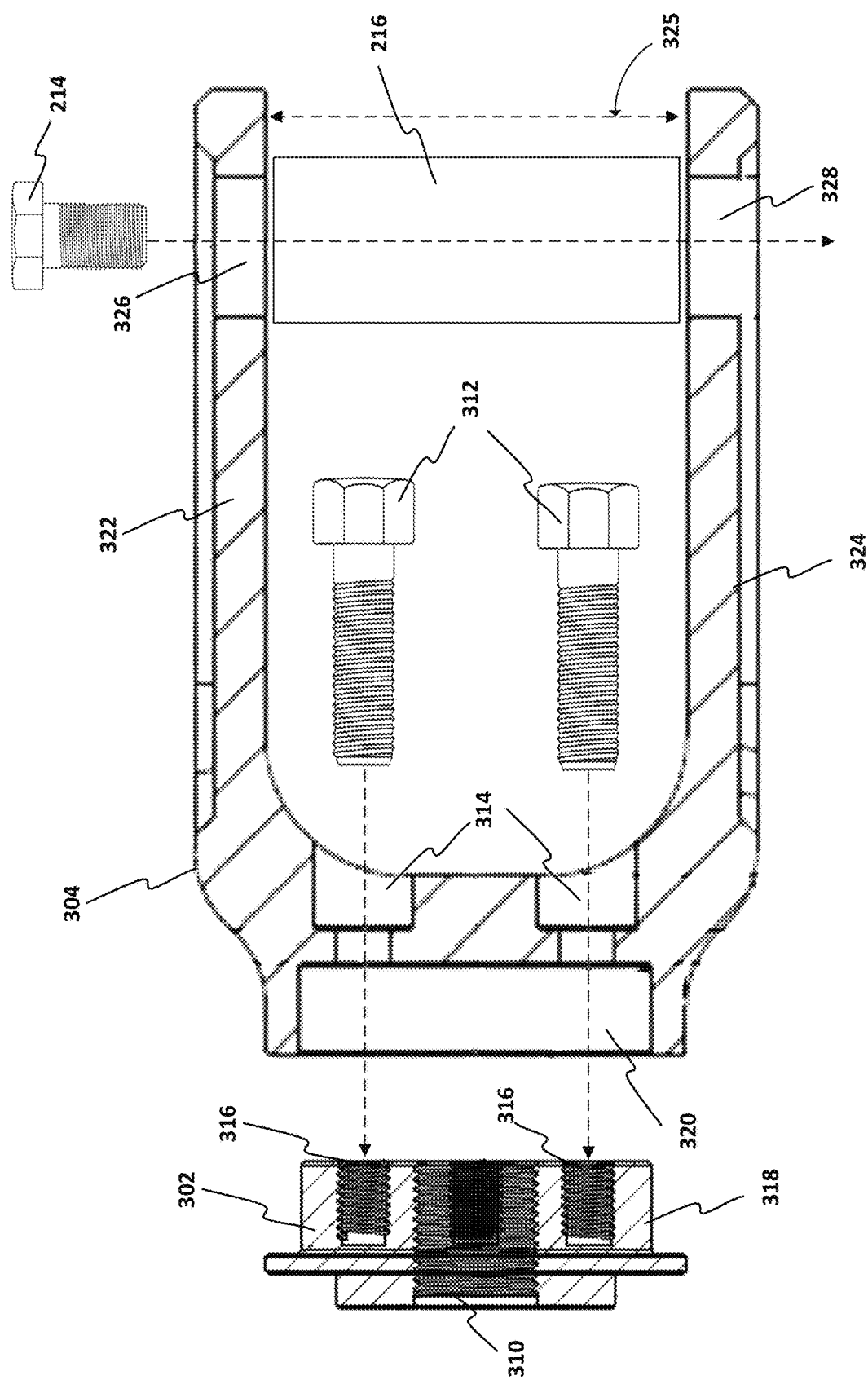
FIG. 4 is a cross-section view of an adapter mount and a modular clevis, in accordance with an embodiment.

With reference now to FIG. 4, a cross-section view of adapter mount 302 and modular clevis 304. Adapter mount 302 can include a threaded opening 310 can receive and be fastened to or coupled with threaded end 220 of shaft 204 of suspension assembly 300 of FIG. 3. Threaded opening 310 can be described as a shaft opening for shaft 204.

In one embodiment, fasteners 312 can be employed to fasten modular clevis 304 to adapter mount 302. Fasteners 312 can pass through openings 314 in modular clevis 304 and into threaded openings 316 of adapter mount 302. Threaded openings 316 of adapter mount 302 are depicted as not passing all the way through adapter mount 302. Threaded openings 316 may or may not pass all the way through adapter mount 302. It should be appreciated that any number of fasteners can be employed fasten modular clevis 304 to adapter mount 302. In one embodiment, a portion 318 of adapter mount 302 can be sized to fit into an opening 320 of modular clevis 304. Fasteners 312 are depicted as bolts with a hexagonal head. It should be appreciated that fasteners 312 can be any type of fastener or bolt. For example, fasteners 312 can have heads with a recessed hexagonal shape that employs a hex key for fastening also referred to as an Allen wrench.

In one embodiment, modular clevis 304 includes a first wing 322 and a second wing 324. First wing 322 and second wing 324 can be substantially parallel to one another. In alternate embodiments, modular clevis 304 can have wings that are not parallel to one another and may or may not be symmetrical in shape. An opening 325 between the first wing 322 and second wing 324 can be configured to receive a structural component of a vehicle and couple to the structural component of the vehicle. Modular clevis 304 with first wing 322 and second wing 324 can form a U shape. First wing 322 can include an opening 326 and second wing 324 can include an opening 328. In one embodiment, a fastener 214 or pin can pass through opening 326, through an opening in structural component 216 of the vehicle, and through opening 328 to couple modular clevis 304 to the vehicle. In one embodiment, opening 326 and opening 328 can each be configured to receive a bushing that the bolt or pin passes through. The structural component 216 can be, but is not limited to a bar, a trailing arm, a control arm, a Constant Velocity (CV) axle, an axle, or other structural components first opening the vehicle. In an embodiment with modular clevis 304 being mounted to a CV axle, modular clevis 304 may be substantially larger than traditional suspension assembly mounts. The modular nature of the invention allows the suspension assembly to be installed to the CV axle while still allowing for a spring of suspension assembly 200 to be changed without disturbing the critical joint of adapter mount 302 and shaft 204.

Figure 5:
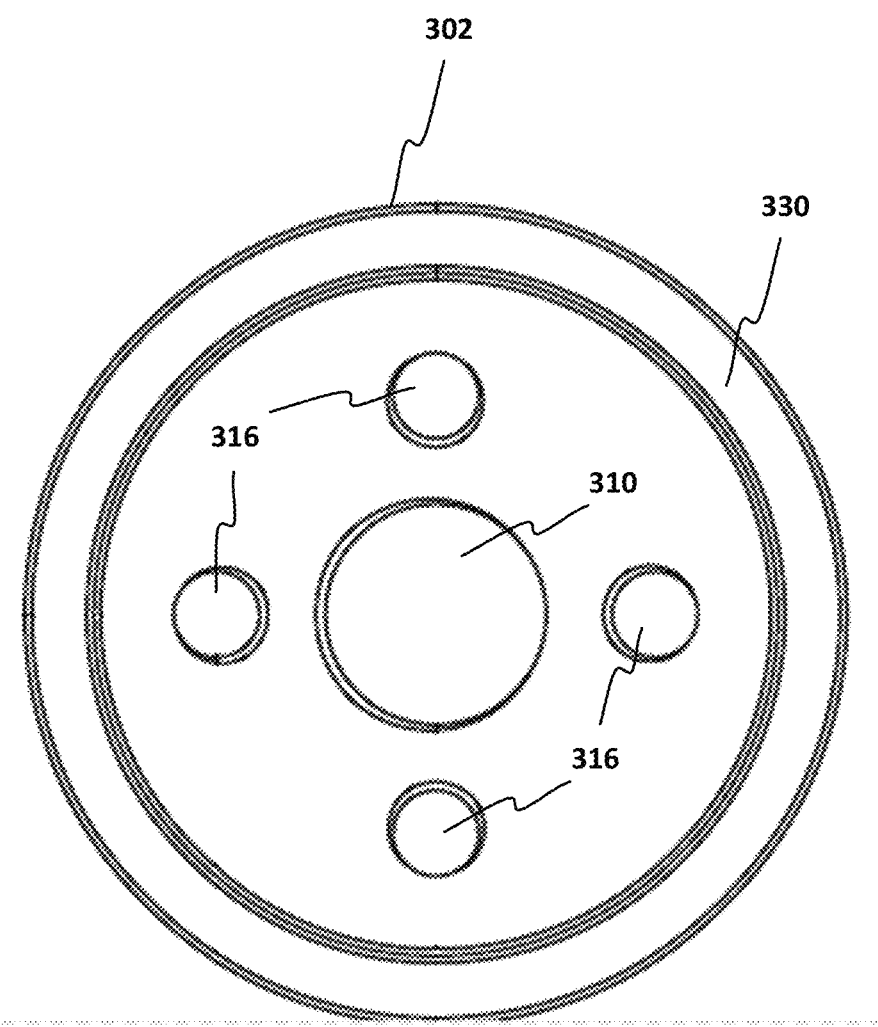
FIG. 5 is a side view of the adapter mount, in accordance with an embodiment.

With reference now to FIG. 5, a side view of adapter mount 302 is depicted with threaded opening 310 and threaded openings 316. FIG. 5 depicts adapter mount 302 with four threaded openings 316. Four threaded openings 316 can be described as a plurality of mount openings. It should be appreciated that adapter mount 302 can include a number of threaded openings to mount to modular clevis 304. A surface 330 of adapter mount 302 can be a surface that faces modular clevis 304 when adapter mount 302 is coupled to modular clevis 304.

Figure 6:
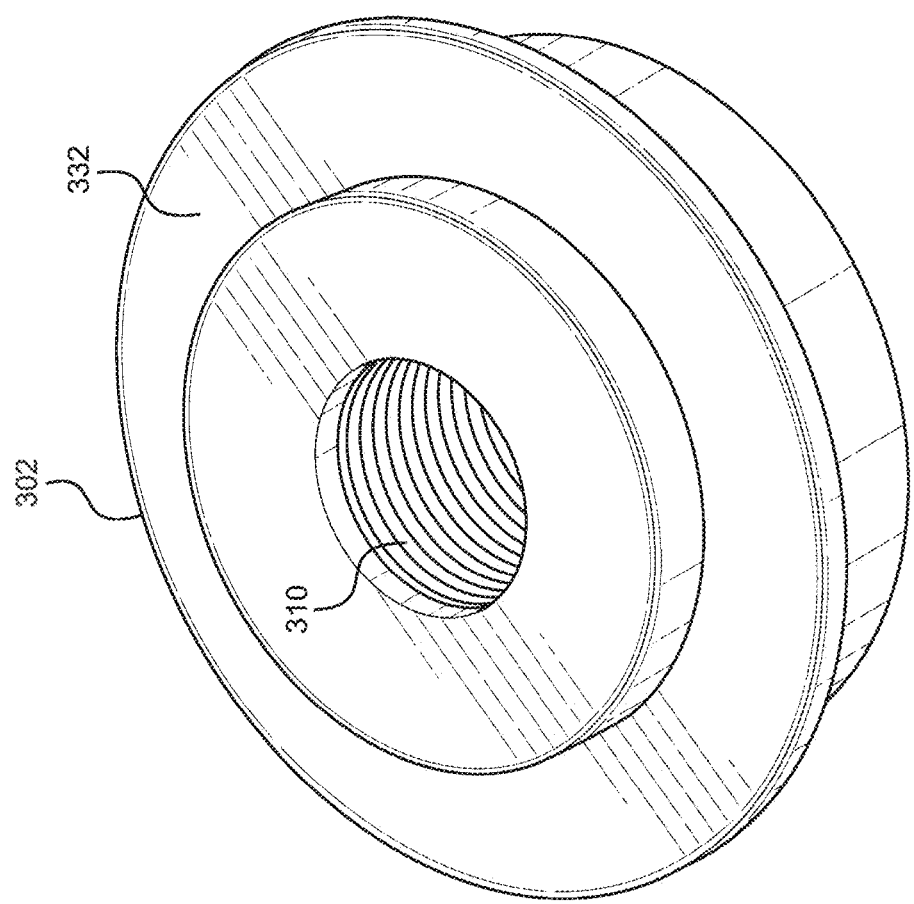
FIG. 6 is a three-dimensional view of the adapter mount, in accordance with an embodiment.

With reference now to FIG. 6, a three-dimensional view is depicted of adapter mount 302 with threaded opening 310. A surface 332 of adapter mount 302 can be a surface that faces damper 202 when adapter mount 302 is coupled to shaft 204.

Figure 7:
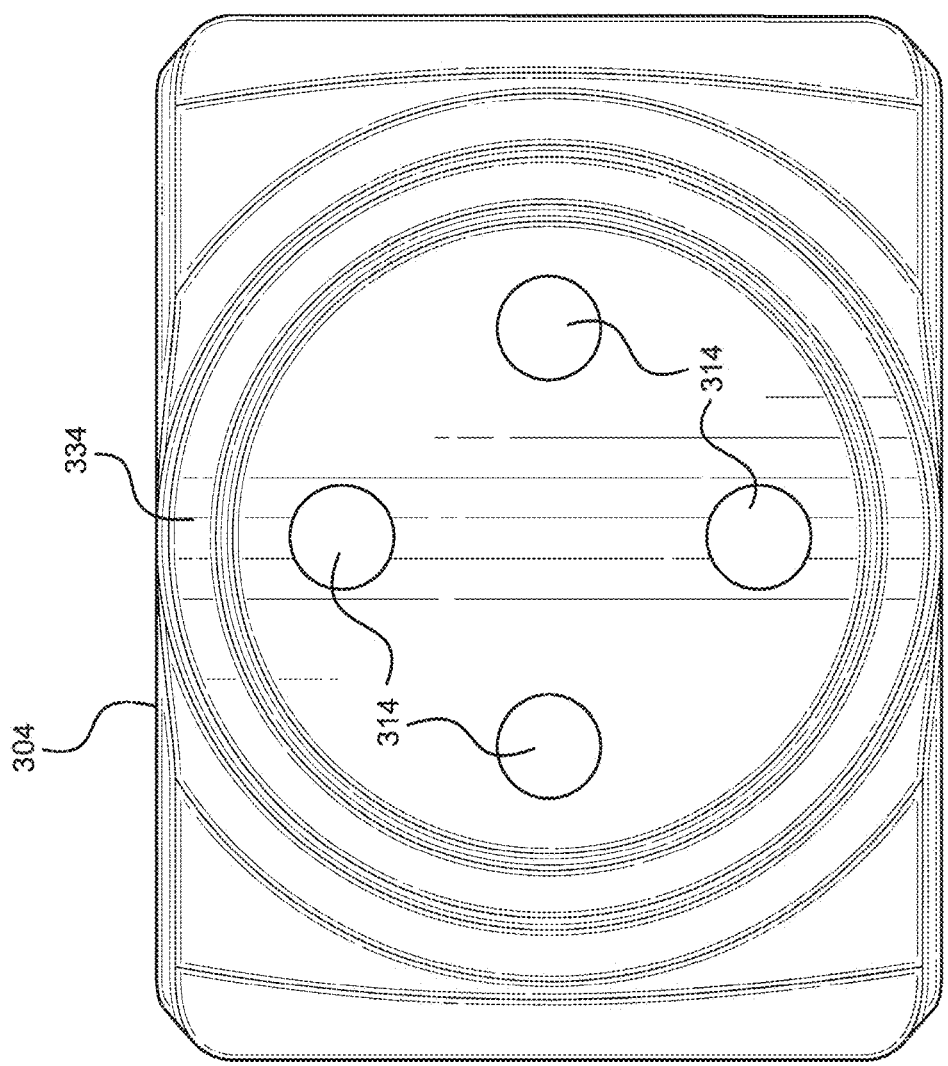
FIG. 7 is a side view of the clevis mount, in accordance with an embodiment.

With reference now to FIG. 7, a side view of modular clevis 304 is depicted with opening 314. FIG. 7 depicts modular clevis 304 with four openings 314. Four openings 314 can be described as a plurality of adapter openings. It should be appreciated that modular clevis 304 can include a number of openings to couple to adapter mount 302. A surface 334 of modular clevis 304 can be a surface that faces adapter mount 302 when adapter mount 302 is coupled to modular clevis 304.

Figure 8:
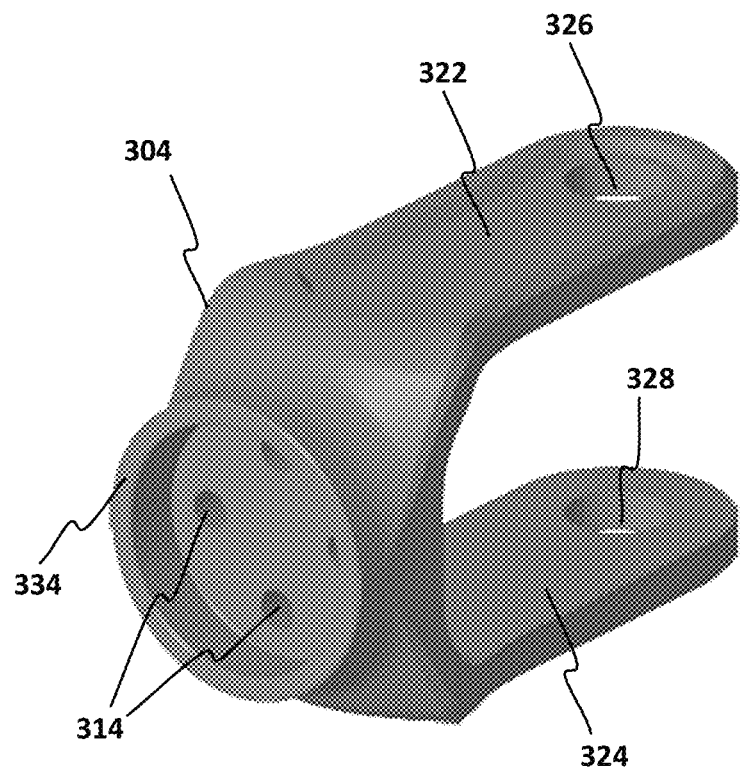
FIG. 8 is a three-dimensional view of the modular clevis, in accordance with an embodiment.

With reference now to FIG. 8, a three-dimensional view is depicted of modular clevis 304. A surface 334 of modular clevis 304 can be a surface that faces adapter mount 302 when adapter mount 302 is coupled to modular clevis 304.

Figure 9:
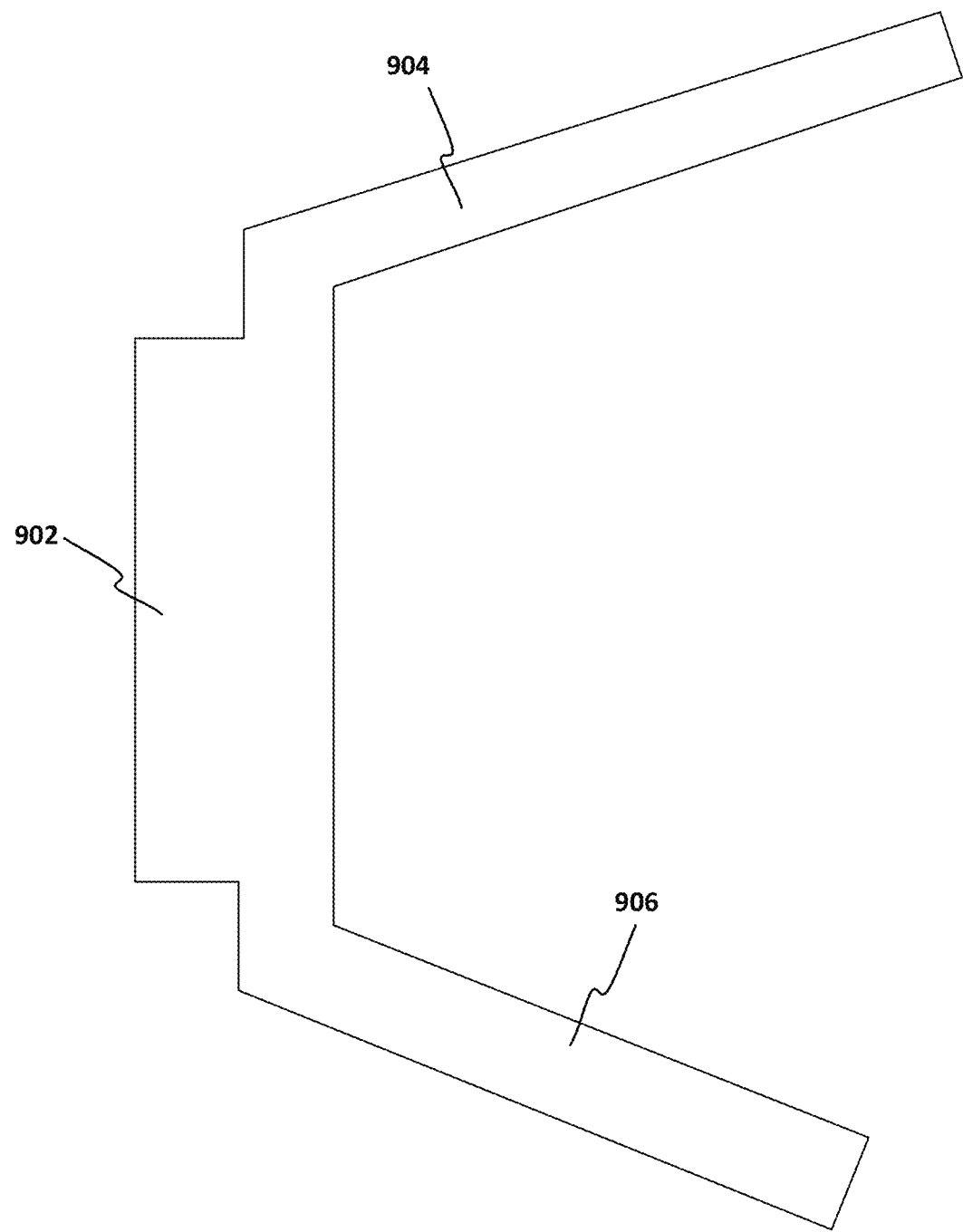
FIG. 9 is a side view of an alternate modular clevis, in accordance with an embodiment.

With reference now to FIG. 9, a side view of an alternate modular clevis 902. Modular clevis 902 is an example of a modular clevis that can be coupled to an adapter mount such as adapter mount 302. Modular clevis 902 can be exchanged for modular clevis 304. In one embodiment, modular clevis 902 has a first wing 904 and a second wing 906 that are not parallel to one another but rather flare away from one another. First wing 904 and second wing 906 form an opening that can be described as trapezoidal. The flared shape of first wing 904 and second wing 906 form a width of modular clevis 902 that may be greater than an inner diameter of a spring associated with a suspension assembly that employs modular clevis 902. Thus modular clevis 902 that is part of a modular two piece modular clevis mount assembly that couples with an adapter mount, where the adapter mount can pass through the inner diameter of the spring, can have a feature of decoupling with the adapter mount so that the spring can be changed.

Figure 10:
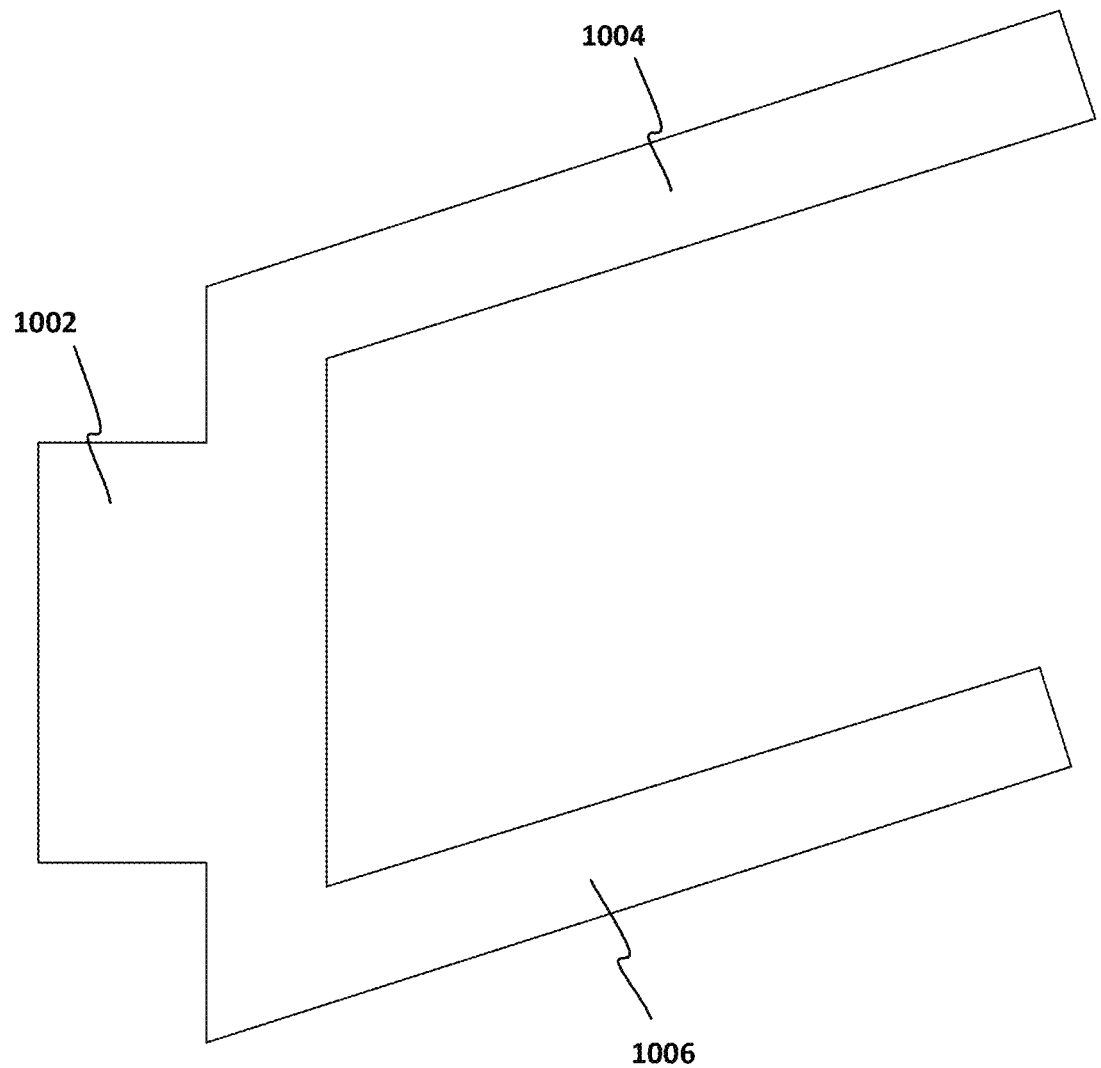
FIG. 10 is a side view of an alternate modular clevis, in accordance with an embodiment.

With reference now to FIG. 10, a side view of an alternate modular clevis 1002. Modular clevis 1002 is an example of a modular clevis that can be coupled to an adapter mount such as adapter mount 302. Modular clevis 1002 can be exchanged for modular clevis 304. In one embodiment, modular clevis 1002 has a first wing 1004 and a second wing 1006 that are substantially parallel to one another. However, one modular clevis 1002 is installed as part of a suspension assembly, such suspension assembly 200 of FIG. 2B, first wing 1004 and second wing 1006 may not be parallel to shaft 204. The shape of first wing 1004 and second wing 1006 form a width of modular clevis 1002 that may be greater than an inner diameter of a spring associated with a suspension assembly that employs modular clevis 1002. Thus, modular clevis 1002 is removably coupleable with an adapter mount, so that the spring can be changed without removing adapter mount from a damper shaft. The angled nature of modular clevis 1002 can allow modular clevis 1002 to be installed into unique or previously difficult to install areas of a vehicle while maintaining the ease of changing springs allowed for by the present invention.

Figure 11:
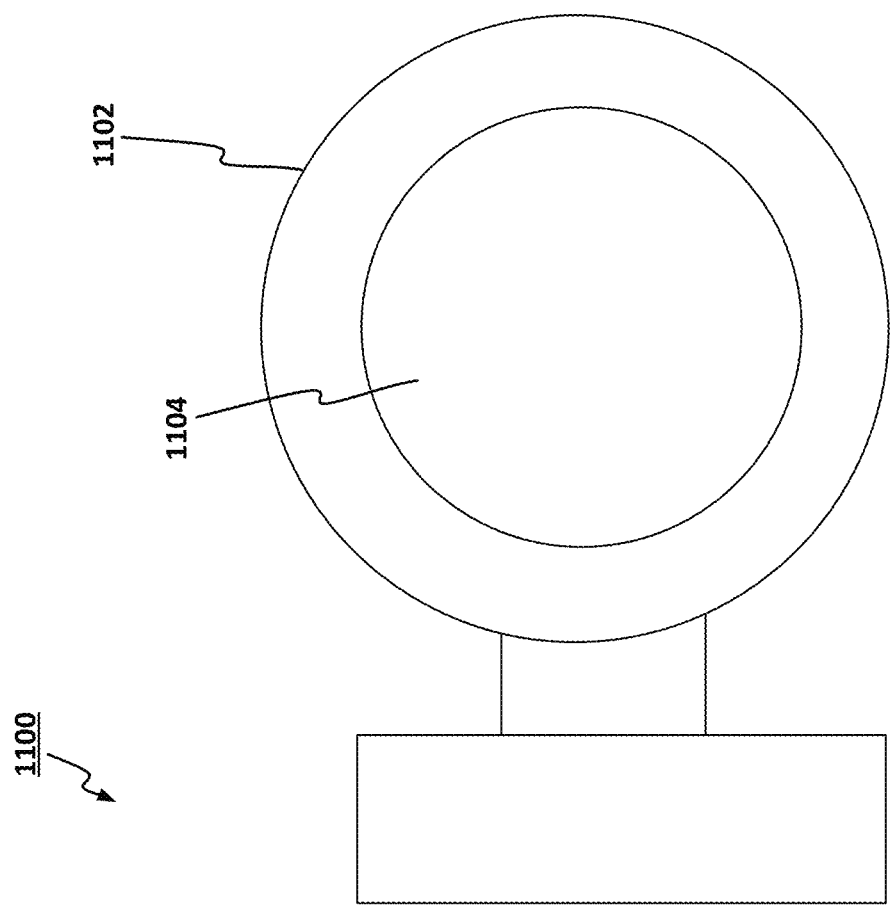
FIG. 11 is a side view of a modular clevis mount assembly with an adapter mount and a modular eyelet, in accordance with an embodiment.
Figure 11:
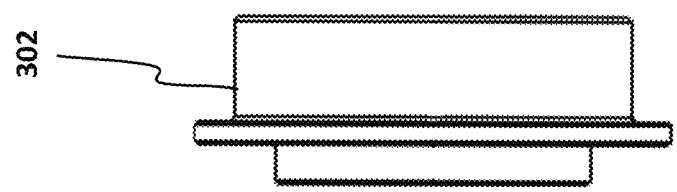

With reference now to FIG. 11, a side view of a modular eyelet mount assembly 1100 including adapter mount 302 and a modular eyelet 1102. Modular eyelet mount assembly 1100 can be referred to as a modular two-piece design with modular eyelet 1102. Modular eyelet mount assembly 1100 may be associated with a suspension assembly that includes a damper a spring. Adapter mount 302 coupleable to a shaft of the damper and modular eyelet 1102 is removably coupleable to adapter mount 302. The spring of the suspension assembly can have an inner diameter that the outer diameter of adapter mount 302 can pass therethrough. Modular eyelet 1102 may or may not be able to pass through the inner diameter of the spring. In one embodiment, modular eyelet 1102 has an opening 1104 configured to couple modular eyelet 1102 to a structural component of a vehicle.

In one embodiment, opening 1104 can be configured to receive a spherical bearing. The spherical bearing can be used to couple modular eyelet 1102 to the vehicle and allow movement in three dimensions. Modular eyelet 1102 is depicted as having a portion that is substantially circular or round in shape. However, modular eyelet 1102 can have any desired shape. Modular eyelet 1102 and adapter mount 302 can be coupled and decoupled from one another while adapter mount 302 remains coupled to the shaft of a damper. Thus, a spring associated with the damper can be changed after modular eyelet 1102 has been decoupled from adapter mount 302 while adapter mount 302 remains coupled to the shaft of the damper.

In one embodiment, adapter mount 302 can remain coupled to a damper and modular eyelet 1102 can be replaced with a modular clevis as described herein. In one embodiment adapter mount 302 is a standard size that allows coupling with any one of a number of different types of modular clevises and/or modular eyelets. Alternatively, different sized adapter mounts can be employed with the same suspension assembly.

Reference throughout this document to "one embodiment," "certain embodiments," "an embodiment," "various embodiments," "some embodiments," "various embodiments", or similar term, means that a particular feature, structure, or characteristic described in connection with that embodiment is included in at least one embodiment. Thus, the appearances of such phrases in various places throughout this specification are not necessarily all referring to the same embodiment. Furthermore, the particular features, structures, or characteristics of any embodiment may be combined in any suitable manner with one or more other features, structures, or characteristics of one or more other embodiments without limitation.

The foregoing Description of Embodiments is not intended to be exhaustive or to limit the embodiments to the precise form described. Instead, the examples set forth herein were presented in order to best explain, to describe particular applications, and to thereby enable those skilled in the art to make and use embodiments of the described examples. However, those skilled in the art will recognize that the foregoing description and examples have been presented for the purposes of illustration and example only. The description as set forth is not intended to be exhaustive or to limit the embodiments to the precise form disclosed. Rather, the specific features and acts described above are disclosed as example forms of implementing the Claims and their equivalents.

What is claimed is:
1. A modular clevis mount assembly comprising:
  a modular clevis comprising:
    a first wing and a second wing parallel to one another wherein said first wing has a first opening and said second wing has a second opening, said first opening and said second opening to couple with a structural component of a vehicle; and
    a plurality of adapter openings;
  an adapter mount comprising:
    a shaft opening configured to receive and couple with a shaft of a damper; and
    a plurality of mount openings to align with said plurality of adapter openings of said modular clevis and to couple with said modular clevis via a plurality of fasteners, wherein said adapter mount is a standard size configured to couple to any one of a plurality of alternate shaped modular clevises.
2. The modular clevis mount assembly of claim 1, wherein an outer diameter of said adapter mount is smaller than an inner diameter of a spring of a suspension assembly associated with said modular clevis mount assembly such that said adapter mount can pass through said inner diameter of said spring.
3. The modular clevis mount assembly of claim 1, wherein a width of said modular clevis is wider than an inner diameter of a spring of a suspension assembly associated with said modular clevis mount assembly such that said modular clevis is not able to pass through said inner diameter of said spring.
4. The modular clevis mount assembly of claim 1, wherein a cross section of said modular clevis with said first wing and said second wing forms a U shape.
5. The modular clevis mount assembly of claim 1, wherein said structural component of said vehicle is a bar, a trailing arm, a control arm, a Constant Velocity (CV) axle, or an axle.
6. The modular clevis mount assembly of claim 1, wherein said adapter mount is configured to be decoupled from said modular clevis and said modular clevis remains coupled to said vehicle.
7. The modular clevis mount assembly of claim 1, wherein said adapter mount is configured to be decoupled from said modular clevis and said adapter mount remains coupled to said shaft of said damper.
8. The modular clevis mount assembly of claim 1, wherein said adapter mount is composed of a different material than said modular clevis.
9. The modular clevis mount assembly of claim 1, wherein said adapter mount is composed of a steel material and said modular clevis is composed of an aluminum material.
10. A suspension assembly, comprising:
  a spring to absorb shocks during operation of a vehicle;
  a damper to dampen an oscillation of said spring after compression from said shocks;
  a modular clevis comprising:
    a first wing and a second wing parallel to one another wherein said first wing has a first opening and said second wing has a second opening, said first opening and said second opening to couple with a structural component of said vehicle; and
    a plurality of adapter openings;
  an adapter mount wherein an outer diameter of said adapter mount is smaller than an inner diameter of said spring such that said adapter mount can pass through said inner diameter of said spring, said adapter mount further comprising:
    a shaft opening configured to receive and couple with a shaft of said damper;

a plurality of mount openings to align with said plurality of adapter openings of said modular clevis and to couple with said modular clevis;

a plurality of fasteners to couple said modular clevis to said adapter mount by passing through said plurality of adapter openings of said modular clevis and fastening to said plurality of mount openings of said adapter mount, wherein said adapter mount is a standard size configured to couple to any one of a plurality of alternate shaped modular clevises.

11. The suspension assembly of claim 10, wherein a width of said modular clevis is wider than said inner diameter of said spring such that said modular clevis is not able to pass through said spring.

12. The suspension assembly of claim 10, wherein a cross section of said modular clevis with said first wing and said second wing forms a U shape.

13. The suspension assembly of claim 10, wherein said structural component of said vehicle is a bar, a trailing arm, a control arm, a Constant Velocity (CV) axle, or an axle.

14. The suspension assembly of claim 10, wherein said adapter mount is configured to be decoupled from said modular clevis and said adapter mount remains coupled to said shaft of said damper.

15. The suspension assembly of claim 10, wherein said adapter mount is composed of a different material than said modular clevis.

* * * * *